United States Patent
Thampy et al.

(10) Patent No.: US 8,055,470 B2
(45) Date of Patent: Nov. 8, 2011

(54) SIMULATED BUCKET TESTING

(75) Inventors: Sajjit Thampy, Sunnyvale, CA (US); Daniel Ferrante, Redwood City, CA (US); Amr Awadallah, Palo Alto, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 480 days.

(21) Appl. No.: 12/031,613

(22) Filed: Feb. 14, 2008

(65) Prior Publication Data
US 2009/0210195 A1  Aug. 20, 2009

(51) Int. Cl.
*G06F 17/18* (2006.01)
(52) U.S. Cl. .................................... 702/179
(58) Field of Classification Search .......... 702/179–181; 705/7–8, 10–11
See application file for complete search history.

(56) References Cited

U.S. PATENT DOCUMENTS

| | | | |
|---|---|---|---|
| 5,892,838 A * | 4/1999 | Brady | 382/115 |
| 6,738,682 B1 * | 5/2004 | Pasadyn | 700/100 |
| 7,356,168 B2 * | 4/2008 | Tavares | 382/115 |
| 2008/0091639 A1 * | 4/2008 | Davis et al. | 707/1 |
| 2008/0098456 A1 * | 4/2008 | Alward et al. | 726/1 |
| 2009/0018897 A1 * | 1/2009 | Breiter | 705/10 |
| 2009/0070170 A1 * | 3/2009 | Krishnamurthy | 705/7 |

OTHER PUBLICATIONS

U.S. Appl. No. 11/841,558, Aug. 20, 2007, Thampy.

* cited by examiner

*Primary Examiner* — Mohamed Charioui
(74) *Attorney, Agent, or Firm* — Berkeley Law & Technology Group, LLP (57) ABSTRACT

The subject matter disclosed herein relates to simulation of bucket testing. In a particular implementation, cohort of users associated with a value for an engagement metric may be selected based at least in part on an intersection of first and second probability distributions. Behavior of the first and second groups may be compared based at least in part on the selected cohort of users.

25 Claims, 3 Drawing Sheets

SIMULATED BUCKET TESTING

BACKGROUND

1. Field

The subject matter disclosed herein relates to simulation of bucket testing.

2. Information

Data processing tools and techniques continue to improve. Information in the form of data is continually being generated or otherwise identified, collected, stored, shared, and analyzed. Databases and other like data repositories are common place, as are related communication networks and computing resources that provide access to such information.

The Internet is ubiquitous; the World Wide Web provided by the Internet continues to grow with new information seemingly being added every second. To provide access to such information, tools and services are often provided, which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and systems that allow for pertinent information to be analyzed in an efficient manner. For example, when conducting studies to determine the impact of a particular product or feature, such as the impact on users of the Internet, an A/B bucket test may be conducted. Such an A/B bucket test may involve showing a random group of users one version of the feature and comparing that group's long term performance with a control group that did not see this feature. However, it is not always possible to foresee the right bucket tests to run. Furthermore, it is not always possible to conduct such an A/B bucket test in a controlled way. Additionally, it is not always possible to conduct such an A/B bucket test retroactively to determine the effect of a feature on users by comparing users who used the feature against ones who didn't.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

When conducting studies to determine the impact of a particular product or feature, such as the impact on users of the Internet, an A/B bucket test may be conducted. Such an A/B bucket test may involve showing a random group of users one version of the feature and compare that group's long term performance with a control group that did not see this feature. However, it is not always possible to foresee the most significant bucket tests to run. Furthermore it is not always possible to conduct such an A/B bucket test in a controlled way. Additionally, it is not always possible to conduct such an A/B bucket test retroactively to determine the effect of a feature on users by comparing users who used the feature against ones who didn't.

Figure 2:
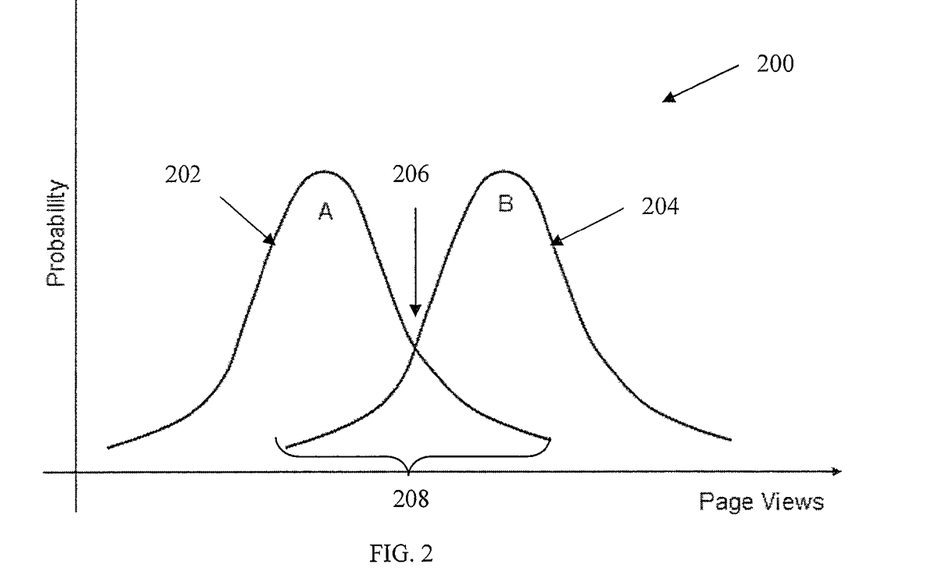
FIG. 2 is a graphical diagram charting page views of users verses a probability in accordance with one or more embodiments.

Referring to FIG. 2, a graphical diagram charting page views of users verses a probability in accordance with one or more embodiments is illustrated. It may be desired to determine whether users who sign up for a given feature F within a product are subsequently more engaged with the product. As used herein, the term "feature" may refer to any discrete portion of a product, such as an aspect, tool, and/or the like, that may be exposed to a random group of users. For example, such a feature may include but is not limited to: embedded links, advertisements, search tools, and/or the like associated with an Internet web page. However, these are merely examples of a feature according to particular implementations and claimed subject matter is not limited in this respect.

As shown, a distribution 200 may be charted of two groups of users. For example, distribution 200 may comprise a first group of users A associated to feature F under a first condition and a second group of users B associated to feature F under a second condition. In one example, distribution 200 may comprise a first group of users A who did not sign up for feature F and a second group of users B who did sign up for feature F. In another example, distribution 200 may comprise a first group of users A who utilized feature F to a lesser extent and a second group of users B who utilized feature F to a greater extent. Examples below may primarily discuss analyzing behavior of users who did and did not sign up for feature F; however, this is just one example of analyzing behavior of users associated to feature F under first and second conditions.

Distribution 200 may chart a distribution of some substantially normally distributed engagement metric for each group. As used herein, the term "normally distributed" may refer to a probability distribution that plots values in a symmetrical fashion and where the results are situated around the mean of the probability distribution so that values are equally likely to plot either above or below the mean and so that values tail off symmetrically away from the mean. As used herein, the term "engagement metric" may refer to a measurement capable of quantifying the intensity of user engagement in a given activity. For example, such an engagement metric may quantify the actions of some users that may increase their engagement over a time period and/or the actions of other users that may decrease the engagement in the same period. Still other users may hardly alter their levels of engagement throughout the same period. It should be understood, however, that these are merely examples of an engagement index according to particular embodiments and that claimed subject matter is not limited in this respect.

According to an embodiment, a first probability distribution 202 of first group of users A and a second probability distribution 204 of second group of users B may diverge at a meeting point 206 of an intersection 208 of the first and second probability distributions 202 and 204. For example, such a divergence between first and second probability distributions 202 and 204 may occur due at least in part on a selection bias, where more engaged users are more likely to be users from second group of users B who did sign up for feature F. Such a selection bias may reduce the accuracy of attempts to isolate and analyze the effect of feature F on user behavior.

In one aspect, procedures described below may be utilized to retroactively simulate an A/B bucket test in order to mine information out of Internet log data associated with actual user behavior. For example, such a retroactively simulated A/B bucket test may be conducted based on actual user behavior and not test condition behavior, such as a separate test for behavior of a test group exposed to a product including feature F compared to behavior of a control group exposed to a product without feature F. Such testing on actual user behavior, as opposed to test condition behavior, may be problematic due to the potential for selection bias in actual user behavior. As described above, selection bias may reduce the accuracy of attempts to isolate and analyze the effect of feature F on user behavior. Accordingly, the procedures described below may reduce the effects of a user selection bias in a causation analysis. For example, procedures described below may retroactively simulate an A/B bucket test from Internet log data. Such a retroactively simulated A/B bucket test may be utilized as a substitute for a traditional A/B bucket test reducing the need for testing and/or analysis prior to the release of a product.

Figure 1:
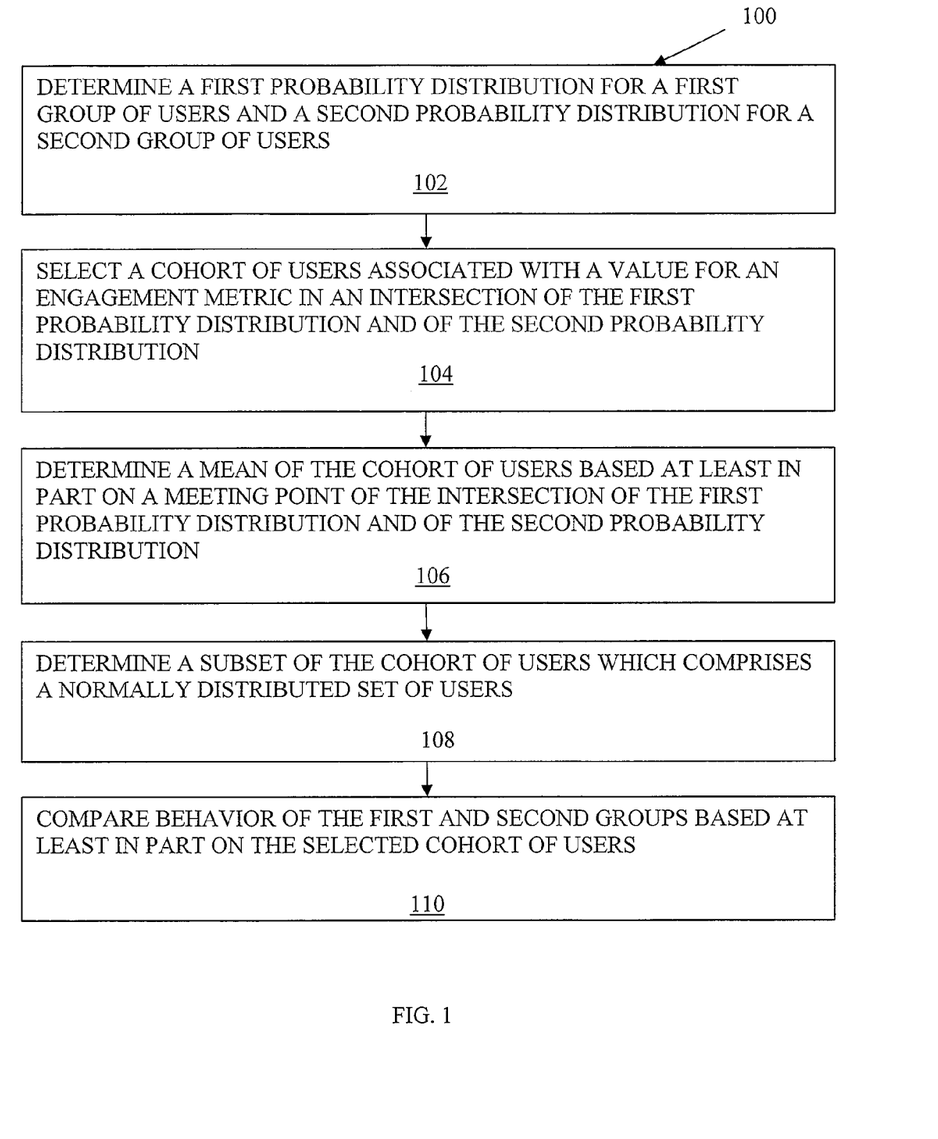
FIG. 1 is a flow diagram illustrating a procedure for simulation of bucket testing in accordance with one or more embodiments.

Procedure 100 illustrated in FIG. 1 may be used for simulation of bucket testing in accordance with one or more embodiments, for example, although the scope of claimed subject matter is not limited in this respect. Additionally, although procedure 100, as shown in FIG. 1, comprises one particular order of actions, the order in which the actions are presented does not necessarily limit claimed subject matter to any particular order. Likewise, intervening actions not shown in FIG. 1 and/or additional actions not shown in FIG. 1 may be employed and/or actions shown in FIG. 1 may be eliminated, without departing from the scope of claimed subject matter.

Procedure 100 depicted in FIG. 1 may in alternative embodiments be implemented in software, hardware, and/or firmware, and may comprise discrete operations. As illustrated, procedure 100 starts at block 102 where a first probability distribution for the first group of users and the second probability distribution for the second group of users may be determined. For example, referring to FIG. 3, first and second probability distribution 202 and 204 may be based at least in part on Internet log data.

Referring back to FIG. 1, at block 104 a cohort of users may be selected. As used herein, the term "cohort of users" may refer to a sub-portion of users. For example, referring to FIG. 3, such a selected cohort of users may comprise a cohort of users associated with a value for an engagement metric located in an intersection 208 of first probability distribution 202 for first group of users A and of second probability distribution 204 for second group of users B. Such a cohort of users may comprise a first cohort set of users 302 comprising a sub-portion of a first group of users A associated to feature F under a first condition and a second cohort set of users 304 comprising a sub-portion of a second group of users B associated to feature F under a second condition. In one example, such a cohort of users may comprise a first cohort set of users 302 comprising a sub-portion of a first group of users A who did not sign up for feature F and a second cohort set of users 304 comprising a sub-portion of a second group of users B who did sign up for feature F. In another example, such a cohort of users may comprise a first cohort set of users 302 comprising a sub-portion of a first group of users A who utilized feature F to a lesser extent and a second cohort set of users 304 comprising a sub-portion of a second group of users B who utilized feature F to a greater extent. Examples below may primarily discuss analyzing behavior of users who did and did not sign up for feature F; however, this is just one example of analyzing behavior of users associated to feature F under first and second conditions. As discussed above, given feature F may comprises a feature associated with an Internet web page.

Referring back to FIG. 1, at block 106 a mean of the cohort of users may be determined. For example, referring to FIG. 3, the mean of the cohort of users may be determined based at least in part on meeting point 206 of the intersection 208 of first probability distribution 202 for the first group of users A and of second probability distribution 204 for second group of users B.

Figure 3:
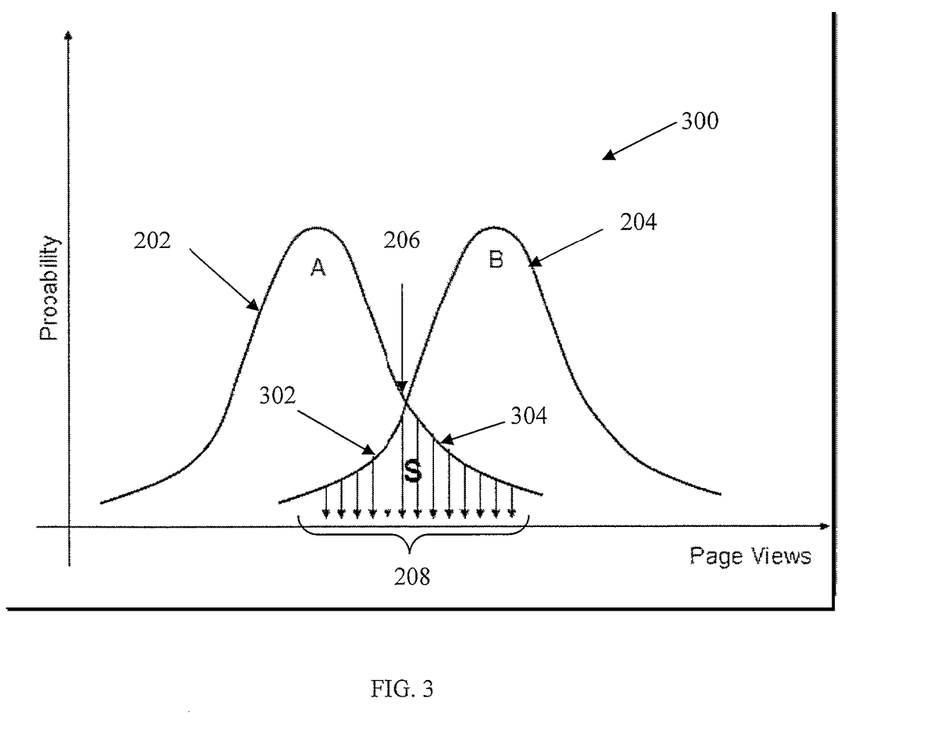
FIG. 3 is a graphical diagram charting page views of users verses a probability in accordance with one or more embodiments.

For example, a mean $\mu_s$ may be determined for a data set $N_s$, where data set $N_s$ may include a set of users $S_A$ within $N_s$ that did not select feature F and a set of users $S_B$ within $N_s$ that did select feature F. As will be described in greater detail below, mean $\mu_s$ and standard deviation $\sigma_s$ may be determined for a data set $N_s$ such that data set $N_s$ has the maximum cardinality possible while also being substantially normally distributed. For example, mean $\mu_s$ of data set $N_s$ may be determined as meeting point 206 of the intersection 208 of first probability distribution 202 for the first group of users A and of second probability distribution 204 for second group of users B, as set forth in the following equations:

$$\mu_s = \begin{cases} \dfrac{\mu_2 - r\mu_1 + \sqrt{(\mu_2 - r\mu_1)^2 - (r-1)B}}{(1-r)} & \text{if } \sigma_1 \neq \sigma_2 \\ \dfrac{\mu_1 + \mu_2}{2} & \text{if } \sigma_1 = \sigma_2 \end{cases} \quad (1)$$

where $$r = \frac{\sigma_2^2}{\sigma_1^2}, \quad (2)$$

and where $$B = \left(\mu_2^2 - r\mu_1^2 + 2\sigma_2^2 \ln\frac{\sigma_2}{\sigma_1}\right). \quad (3)$$

In equations (1-3) above, a mean $\mu_1$ and a standard deviation $\sigma_1$ are associated with first probability distribution 202 for the first group of users A and a mean $\mu_2$ and a standard deviation $\sigma_2$ are associated with second probability distribution 204. In equation (1) above, mean $\mu_s$ of data set $N_s$ may be determined by a first methodology in cases where $\sigma_1$ does not equal $\sigma_2$ and may be determined by a second methodology in cases where $\sigma_1$ equals $\sigma_2$.

Referring back to FIG. 1, at block 108 a subset of the cohort of users may be determined which comprises a substantially normally distributed set of users. For example, referring to FIG. 3, such a subset of the cohort of users may be determined so as to comprise a first cohort set of users 302 comprising users that did not select given feature F and a second cohort set of users 304 comprising users that did select given feature F.

Such a determination of a substantially normally distributed set of users may comprise a number of operations. For example, an initial estimate of standard deviation may be set. A probability that a subset of the cohort of users may include an individual user for each individual user in the cohort of users may then be determined. Individual users associated with such a probability may be included within the subset of the cohort of users or excluded from the subset of the cohort of users based at least in part on the given probability. Next, the standard deviation may be increased by a step size amount. The operation of determining a probability that a subset of the cohort of users includes an individual user may then be repeated. For example, determining the probability that the subset of the cohort of users will include an individual user may be repeated until standard deviation reaches a set maximum standard deviation, for example.

For example, a standard deviation $\sigma_s$ may be determined for a data set $N_s$, where data set $N_s$ may include a set of users $S_A$ within $N_s$ that did not select feature F and a set of users $S_B$ within $N_s$ that did select feature F. For such a data set $N_s$, an initial small standard deviation estimate $\delta_{min}$ and a maximum standard deviation $\delta_{max}$ may be set for standard deviation $\sigma$. Additionally, a stepping size $\theta$ may be set for use in stepping from the initial small standard deviation estimate $\delta_{min}$ to the maximum standard deviation $\delta_{max}$. Initially, standard deviation $\sigma$ is set to initial small standard deviation estimate $\delta_{min}$. At the beginning of the procedure, a data set $N_c$ is set to an empty set $\emptyset$. For users within data set $N_s$ whose value for the variable of interest is x, such users may be included in the set $N_c$ with a probability as follows:

$$P \leftarrow \frac{1}{\sigma\sqrt{2\pi}} e^{-\frac{(z-\mu_2)^2}{2\sigma^2}}. \tag{4}$$

Users that have a given probability P may be included within data set $N_c$. A hash function may be set based at least in part on the data set $N_c$ as follows:

$$f(\sigma) \leftarrow \|N_c\| \tag{5}$$

Data set $N_c$ may be stored in a hash function as follows:

$$g(\sigma) \leftarrow N_c \tag{6}$$

Standard deviation $\sigma$ then may be increased by stepping size $\theta$ and the procedure may be repeated. The procedure may be repeated until standard deviation $\sigma$ is increased by stepping size $\theta$ the point where standard deviation $\sigma$ is no longer less than maximum standard deviation $\delta_{max}$. When the standard deviation $\sigma$ becomes greater than or equal to maximum standard deviation $\delta_{max}$, a data set $N_c$ may be returned that corresponds to the maximum hash value as follows:

$$g\left(\arg\max_{\sigma} f(\sigma)\right). \tag{7}$$

The procedure above may result in determining a substantially normally distributed set of users $S_A$ within $N_s$ that did not select feature F and a set of users $S_B$ within $N_s$ that did select feature F.

Referring back to FIG. 1, at block 110, behavior of the first and second groups may be compared. For example, referring to FIG. 3, behavior of the first and second groups of users A and B may be compared based at least in part on the selected cohort of users. Such a comparison of the behavior of the first and second groups of users A and B may comprise comparing an effect of given feature F on the behavior of the first and second groups of users A and B. More specifically, such a comparison of the behavior of the first and second groups of users A and B may comprise comparing an effect of given feature F on the behavior of the first and second cohort sets of users 302 and 304, for example.

For example, comparing the behavior of first cohort set of users 302 comprising users that did not select given feature F and second cohort set of users 304 comprising users that did select given feature F, rather than comparing first and second groups of users A and B, may reduce the impact of any selection bias. Further, comparing the behavior of first and second cohort set of users 302 and 304 may reduce the impact of any selection bias in cases where the impact of feature F on a metric in question is being studied. Such a comparison of the behavior of first and second cohort set of users 302 and 304 may not cover the full spectrum of engaged users; however, it may be statistically equivalent to conducting a live A/B bucket test.

Figure 4:
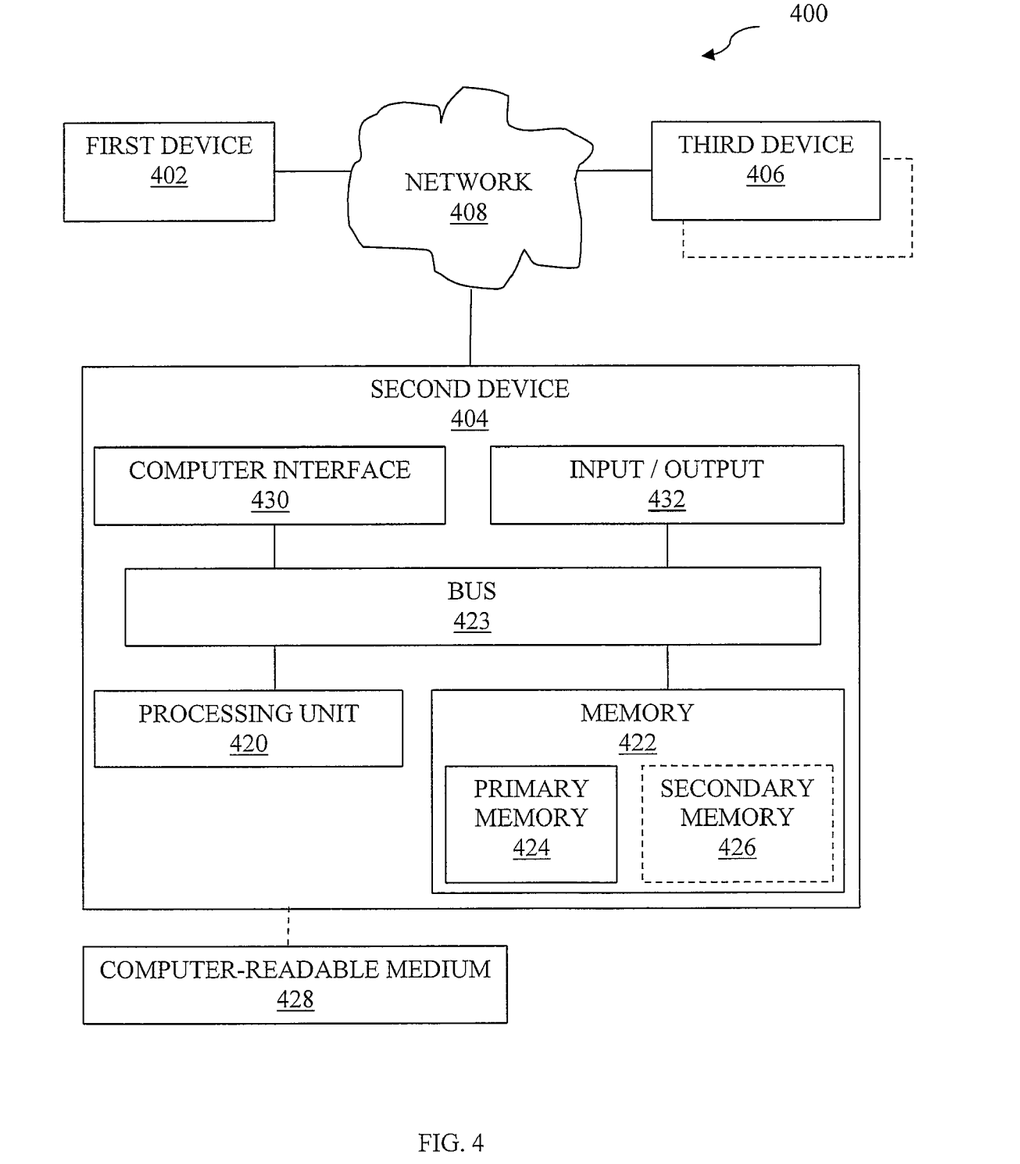
FIG. 4 is a schematic diagram of a computing platform in accordance with one or more embodiments.

FIG. 4 is a schematic diagram illustrating an exemplary embodiment of a computing environment system 400 that may include one or more devices configurable to simulate bucket testing using one or more techniques illustrated above, for example. System 400 may include, for example, a first device 402, a second device 404, and a third device 406, which may be operatively coupled together through a network 408.

First device 402, second device 404, and third device 406, as shown in FIG. 4, may be representative of any device, appliance or machine that may be configurable to exchange data over network 408. By way of example, but not limitation, any of first device 402, second device 404, or third device 406 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 408, as shown in FIG. 4, is representative of one or more communication links, processes, and/or resources configurable to support the exchange of data between at least two of first device 402, second device 404, and third device 406. By way of example, but not limitation, network 408 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 406, there may be additional like devices operatively coupled to network 408.

It is recognized that all or part of the various devices and networks shown in system 400, and the processes and methods as further described herein, may be implemented using, or otherwise including, hardware, firmware, software, or any combination thereof.

Thus, by way of example, but not limitation, second device 404 may include at least one processing unit 420 that is operatively coupled to a memory 422 through a bus 423.

Processing unit 420 is representative of one or more circuits configurable to perform at least a portion of a data computing procedure or process. By way of example, but not limitation, processing unit 420 may include one or more processors, controllers, microprocessors, microcontrollers, application specific integrated circuits, digital signal processors, programmable logic devices, field programmable gate arrays, and the like, or any combination thereof.

Memory 422 is representative of any data storage mechanism. Memory 422 may include, for example, a primary memory 424 and/or a secondary memory 426. Primary memory 424 may include, for example, a random access memory, read only memory, etc. While illustrated in this example as being separate from processing unit 420, it should be understood that all or part of primary memory 424 may be provided within or otherwise co-located/coupled with processing unit 420.

Secondary memory 426 may include, for example, the same or similar type of memory as primary memory and/or one or more data storage devices or systems, such as, for example, a disk drive, an optical disc drive, a tape drive, a solid state memory drive, etc. In certain implementations, secondary memory 426 may be operatively receptive of, or otherwise configurable to couple to, a computer-readable medium 428. Computer-readable medium 428 may include, for example, any medium that can carry and/or make accessible data, code and/or instructions for one or more of the devices in system 400.

Second device 404 may include, for example, a communication interface 430 that provides for or otherwise supports the operative coupling of second device 404 to at least network 408. By way of example, but not limitation, communication interface 430 may include a network interface device or card, a modem, a router, a switch, a transceiver, and the like.

Second device 404 may include, for example, an input/output 432. Input/output 432 is representative of one or more devices or features that may be configurable to accept or otherwise introduce human and/or machine inputs, and/or one or more devices or features that may be configurable to deliver or otherwise provide for human and/or machine outputs. By way of example, but not limitation, input/output device 432 may include an operatively configured display, speaker, keyboard, mouse, trackball, touch screen, data port, etc.

With regard to system 400, in certain implementations, first device 402 may be configurable to simulate bucket testing using one or more techniques illustrated above. For example, a simulated bucket testing procedure may operate by having first device 402 access network 408 to retrieve Internet log data for the creation of a result set. Based on the result set, first device 402 may determine a first probability distribution for a first group of users and a second probability distribution for a second group of users based at least in part on Internet log data. First device 402 may then select a cohort of users associated with a value for an engagement metric in an intersection of the first and second probability distributions. First device 402 may then compare the behavior of the first and second groups based at least in part on the selected cohort of users.

It should also be understood that, although particular embodiments have just been described, the claimed subject matter is not limited in scope to a particular embodiment or implementation. For example, embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description above.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

Unless specifically stated otherwise, as apparent from the preceding discussion, it is appreciated that throughout this specification discussions utilizing terms such as processing, computing, calculating, selecting, forming, transforming, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of a claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
   obtaining a first probability distribution for a first group of users, the first group of users comprising at least two users, and a second probability distribution for a second group of users, the second group of users comprising at least two users;
   determining an intersection of the first probability distribution and of the second probability distribution;
   selecting a cohort of users associated with a value for an engagement metric based at least in part on the intersection; and
   comparing behavior of the first and second groups based at least in part on the selected cohort of users;
   wherein at least the determining, selecting, and comparing are performed via one or more computing platforms.

2. The method of claim 1, further comprising determining the first probability distribution for the first group of users and the second probability distribution for the second group of users based at least in part on network log data.

3. The method of claim 1, wherein said comparing the behavior of the first and second groups comprises comparing an effect of a given feature on the behavior of the first and second groups.

4. The method of claim 1, wherein said comparing the behavior of the first and second groups comprises comparing an effect of a given feature on the behavior of the first and second groups, and wherein the given feature comprises a feature associated with a network web page.

5. The method of claim 1, wherein said comparing the behavior of the first and second groups comprises comparing an effect of a given feature on the behavior of the first and second groups, and wherein the first group of users comprises users that did not select the given feature and the second group of users comprises users that did select the given feature.

6. The method of claim 1, wherein the cohort of users comprises a first cohort set of users comprising users that did not select a given feature and a second cohort set of users comprising users that did select the given feature.

7. The method of claim 1, further comprising determining a mean of the cohort of users based at least in part on a meeting point of the intersection of the first probability distribution for the first group of users and of the second probability distribution for the second group of users.

8. The method of claim 1, further comprising determining a subset of the cohort of users which comprises a substantially normally distributed set of users, and wherein the subset of the cohort of users comprises a first cohort set of users comprising users that did not select a given feature and a second cohort set of users comprising users that did select the given feature.

9. The method of claim 1, further comprising determining a subset of the cohort of users which comprises a substantially normally distributed set of users, wherein the subset of the cohort of users comprises a first cohort set of users comprising users that did not select a given feature and a second cohort set of users comprising users that did select the given feature, and wherein said determining the subset of the cohort of users comprises:
   setting an initial estimate of a standard deviation;
   determining a probability that the subset of the cohort of users will include an individual user for each individual user in the cohort of users;

including individual users with a given probability within the subset of the cohort of users;
increasing the size of the standard deviation by a step size amount; and
repeating said determining the probability that the subset of the cohort of users will include an individual user for each user in the cohort of users until the standard deviation reaches a maximum standard deviation.

10. The method of claim 1, further comprising:
determining the first probability distribution for the first group of users and the second probability distribution for the second group of users based at least in part on Internet log data;
wherein the cohort of users comprises a first cohort set of users comprising users that did not select a given feature and a second cohort set of users comprising users that did select the given feature, and wherein the given feature comprises a feature associated with an Internet web page;
determining a mean of the cohort of users based at least in part on a meeting point of the intersection of the first probability distribution for the first group of users and of the second probability distribution for the second group of users;
determining a subset of the cohort of users which comprises a normally distributed set of users, wherein the subset of the cohort of users comprises a first cohort set of users comprising users that did not select a given feature and a second cohort set of users comprising users that did select the given feature, and wherein said determining the subset of the cohort of users comprises:
setting an initial estimate of standard deviation;
determining a probability that the subset of the cohort of users will include an individual user for each individual user in the cohort of users;
including individual users with a given probability within the subset of the cohort of users;
increasing the size of the standard deviation by a step size amount; and
repeating said determining the probability that the subset of the cohort of users will include an individual user for each user in the cohort of users until the standard deviation reaches a maximum standard deviation; and
wherein said comparing the behavior of the first and second groups comprises comparing an effect of the given feature on the behavior of the first and second cohort sets of users.

11. An article comprising:
a non-transitory storage medium comprising machine-readable instructions stored thereon which are executable by one or more processors to:
process a first probability distribution for a first group of users, the first group of users comprising at least two users, and a second probability distribution for a second group of users, the second group of users comprising at least two users;
determine an intersection of the first probability distribution and of the second probability distribution;
select a cohort of users associated with a value for an engagement metric based at least in part on the intersection; and
compare behavior of the first and second groups based at least in part on the selected cohort of users.

12. The article of claim 11, wherein the cohort of users comprises a first cohort set of users comprising users that did not select a given feature and a second cohort set of users comprising users that did select the given feature.

13. The article of claim 11, wherein said machine-readable instructions are further executable by said one or more processors to:
determine a mean of the cohort of users based at least in part on a meeting point of the intersection of the first probability distribution for the first group of users and of the second probability distribution for the second group of users.

14. The article of claim 11, wherein said machine-readable instructions are further executable by said one or more processors to:
determine a subset of the cohort of users which comprises a normally distributed set of users, and wherein the subset of the cohort of users comprises a first cohort set of users comprising users that did not select a given feature and a second cohort set of users comprising users that did select the given feature.

15. The article of claim 11, wherein said machine-readable instructions are further executable by said one or more processors to:
determine a subset of the cohort of users which comprises a normally distributed set of users, wherein the subset of the cohort of users comprises a first cohort set of users comprising users that did not select a given feature and a second cohort set of users comprising users that did select the given feature, by:
setting an initial estimate of a standard deviation;
determining a probability that the subset of the cohort of users will include an individual user for each individual user in the cohort of users;
including individual users with a given probability within the subset of the cohort of users;
increasing the size of the standard deviation by a step size amount; and
repeating said determining the probability that the subset of the cohort of users will include an individual user for each user in the cohort of users until the standard deviation reaches a maximum standard deviation.

16. An apparatus comprising:
a computing platform, said computing platform being adapted to:
obtain a first probability distribution for a first group of users, the first group of users comprising at least two users, and a second probability distribution for a second group of users, the second group of users comprising at least two users;
determine an intersection of the first probability distribution and of the second probability distribution;
select a cohort of users associated with a value for an engagement metric based at least in part on the intersection; and
compare behavior of the first and second groups based at least in part on the selected cohort of users.

17. The apparatus of claim 16, wherein the cohort of users comprises a first cohort set of users comprising users that did not select a given feature and a second cohort set of users comprising users that did select the given feature.

18. The apparatus of claim 16, wherein said computing platform is further adapted to:
determine a mean of the cohort of users based at least in part on a meeting point of the intersection of the first probability distribution for the first group of users and of the second probability distribution for the second group of users.

19. The apparatus of claim 16, wherein said computing platform is further adapted to:

determine a subset of the cohort of users which comprises a normally distributed set of users, and wherein the subset of the cohort of users comprises a first cohort set of users comprising users that did not select a given feature and a second cohort set of users comprising users that did select the given feature.

20. The apparatus of claim 16, wherein said computing platform is further adapted to:

determine a subset of the cohort of users which comprises a normally distributed set of users, wherein the subset of the cohort of users comprises a first cohort set of users comprising users that did not select a given feature and a second cohort set of users comprising users that did select the given feature, by:

setting an initial estimate of a standard deviation;

determining a probability that the subset of the cohort of users will include an individual user for each individual user in the cohort of users;

including individual users with a given probability within the subset of the cohort of users;

increasing the size of the standard deviation by a step size amount; and repeating said determining the probability that the subset of the cohort of users will include an individual user for each user in the cohort of users until the standard deviation reaches a maximum standard deviation.

21. An apparatus comprising:

means for obtaining a first probability distribution for a first group of users, the first group of users comprising at least two users, and a second probability distribution for a second group of users, the second group of users comprising at least two users;

means for determining an intersection of the first probability distribution and of the second probability distribution;

means for selecting a cohort of users associated with a value for an engagement metric based at least in part on the intersection; and means for comparing behavior of the first and second groups based at least in part on the selected cohort of users.

22. The apparatus of claim 21, wherein the cohort of users comprises a first cohort set of users comprising users that did not select a given feature and a second cohort set of users comprising users that did select the given feature.

23. The apparatus of claim 21, further comprising:

means for determining a mean of the cohort of users based at least in part on a meeting point of the intersection of the first probability distribution for the first group of users and of the second probability distribution for the second group of users.

24. The apparatus of claim 21, further comprising:

means for determining a subset of the cohort of users which comprises a normally distributed set of users, and wherein the subset of the cohort of users comprises a first cohort set of users comprising users that did not select a given feature and a second cohort set of users comprising users that did select the given feature.

25. The apparatus of claim 21, further comprising:

means for determining a subset of the cohort of users which comprises a normally distributed set of users, wherein the subset of the cohort of users comprises a first cohort set of users comprising users that did not select a given feature and a second cohort set of users comprising users that did select the given feature, and wherein said means for determining the subset of the cohort of users comprises:

means for setting an initial estimate of a standard deviation;

means for determining a probability that the subset of the cohort of users will include an individual user for each individual user in the cohort of users;

means for including individual users with a given probability within the subset of the cohort of users;

means for increasing the size of the standard deviation by a step size amount; and means for repeating said determining the probability that the subset of the cohort of users will include an individual user for each user in the cohort of users until the standard deviation reaches a maximum standard deviation.

* * * * *